United States Patent [19]

Pasieka et al.

[11] 4,114,954
[45] Sep. 19, 1978

[54] HYDRAULIC HOISTING

[75] Inventors: Arnold Roy Pasieka, Don Mills; John Corner Wilson, Falconbridge; George Alexander Moruzi, Sudbury, all of Canada

[73] Assignee: Falconbridge Nickel Mines Limited', Toronto, Canada

[21] Appl. No.: 799,593

[22] Filed: May 23, 1977

[51] Int. Cl.² .............................................. B65G 53/30
[52] U.S. Cl. ........................................ 302/14; 299/18
[58] Field of Search ....................... 302/14, 15, 16, 17, 302/26, 51, 57, 66; 299/18, 19

[56] References Cited

U.S. PATENT DOCUMENTS

| | | | |
|---|---|---|---|
| 2,793,082 | 5/1957 | Gardner | 302/14 |
| 2,920,922 | 1/1960 | Minnick et al. | 302/14 |
| 3,185,529 | 5/1965 | Davies et al. | 302/14 |
| 3,371,965 | 3/1968 | MacLellan | 302/14 |
| 3,881,775 | 5/1975 | McPherson et al. | 302/14 X |
| 3,942,841 | 3/1976 | McCain | 302/14 |
| 3,982,789 | 9/1976 | Funk | 302/14 |

FOREIGN PATENT DOCUMENTS 821,884   12/1937   France ........................................ 302/15

Primary Examiner—Evon C. Blunk
Assistant Examiner—James L. Rowland
Attorney, Agent, or Firm—Richard J. Hicks; Stanley E. Johnson

[57] ABSTRACT

A method and apparatus for hydraulically hoisting particulate solid mined minerals from one mine level to another in which bore holes are used as conveying conduits for the mineral-water mixtures. Batches of the mineral are charged into a pressure vessel at a lower level and discharged intermittently into a borehole conduit system in which water is circulated, under pressure, between the two mine levels. The mineral is separated from the conveying water at a higher level by a conventional dewatering apparatus and the water is returned to the vessel for mixing with a new batch of mineral. The method is conducted cyclically with mineral batches being charged to and then discharged from the vessel at controlled intervals, the control being achieved by valve means which alternately isolate and integrate the vessel with the water circuit. The pressure vessel is further characterized by a discharge port in a sidewall of the vessel connected to a discharge pipe outside the vessel. The other end of the discharge pipe is connected to the hoist borehole.

7 Claims, 2 Drawing Figures

HYDRAULIC HOISTING

This invention is concerned with the transportation of particulate solid materials and, in particular, to the transport of such materials in water. The invention specifically contemplates hydraulically hoisting mined minerals from a working level of a mine to a higher level, or to the surface.

Ore mined at a rock face underground is raised to surface conventionally by a technique known as "skip hoisting" wherein the ore is transported underground to a central loading facility and then subsequently hoisted up a shaft in specially designed skips. This method preempts much of the shaft capacity of the mine and for some time various methods of hydraulic hoisting have been described in the literature in which it is suggested to transport ore by pumping it up a shaft in a pipe as a mixture with water. The advantages of such a concept include greater hoisting capacity, smaller shafts, and a potential for automation.

Ore feeding techniques in this technology divide principally into those which employ a slurry pump through which finely ground ore passes and those which pump only relatively clean water into which coarse ore is introduced, downstream from the pump, by means of a batch feeder known as a lock-hopper. For a review of the different types of feeding methods available, attention is directed to "A study of the hydro-lift feeder for introducing solids into a hydraulic-hoisting installation" by B. Laubscher presented at the Oct. 16–20, 1974 Hoisting Conference sponsored by SAIMechE.

In the slurry pumping method, it is known to hoist ore from deep mines such as those in the Vaal Reefs operation in South Africa. In this manner, the transfer of the ore is simplified but crushing and grinding operations must be done underground which adds substantially to the cost of the operation. Furthermore, the slurry is usually abrasive and wear in pumps and conveying lines is correspondingly severe.

The lock-hopper method avoids some of the disadvantages associated with slurry pumping by handling coarser material but it is restricted by the depth at which it can be used. Commercial lock-hopper installations for hoisting coarse materials are known but they are almost exclusively confined to coal, a material of relatively low specific gravity, and are restricted to hoisting depths generally less than about 1,000 ft. In the few cases where lock-hoppers are used to hoist coarse hard-rock ore, the hoisting height is only a few hundred feet.

A lock-hopper system of particular relevance to that described in the present invention is disclosed by Davies et al in U.S. Pat. No. 3,185,529 issued May 25, 1965. A pressurized lock-hopper system inside which a vertically-oriented and coaxial nozzle directs water upwardly at high pressure is described. The water entrains a charge of ore in the vessel and discharges into the mouth of a coaxially-oriented central conveyor pipe which connects the vessel interior with the discharge location of the hoist system. When the discharging is completed, a sleeve on the central conveyor pipe is advanced downwardly to meet the nozzle thereby isolating the water flow from the vessel and allowing depressurization of the vessel interior for charging with a new batch of ore. In a modification described in the Laubscher article supra, the nozzle is moved upwardly to meet the mouth of the central pipe to achieve the same end.

In all prior art hydraulic hoisting systems, however, whether of the lock-hopper or slurry pump type, the wear on the ore conduits which hoist the ore-water mixture is a major problem. As far as is known, existing descriptions of hydraulic hoisting systems rely exclusively on pressurized vessels or slurry pumps which thrust the ore to the surface, or to an elevated level, by way of prefabricated pipes fastened to the walls of larger mine openings in the rock. For deep mine workings, in particular, it will be appreciated that the conveying pipes which make up the conduit system are difficult to install, requiring an independent shaft to be sunk and the joining of many lengths of pipe at numerous accessible locations in the mine. Apart from the capital cost considerations of such an undertaking, the maintenance required for the piping system is likely to be excessive. Inadequate conduit systems, therefore, are felt to be one reason that the obvious benefits of hydraulic hoisting have not been extended to deep mining.

Further, it is apparent that any commercially successful hydraulic hoisting installation must provide ore hoisting capacities that are competitive with existing skip facilities. Since lock-hoppers are batch handling devices, it follows that the hoisting cycle should be of as short a duration as possible to maximize the hoisting rate for a given vessel size. Prior art systems have not taught adequate and specific means for accomplishing this relatively high frequency shuttle type of operation. In particular, the co-axial arrangement of the lock-hopper and vertical discharge pipe described in the aforementioned U.S. Pat. No. 3,185,529 is believed to be unsatisfactory for the rapid sequential type of operation referred to hereinafter with reference to the present invention. Indeed, it is believed essential to ensure rapid and unimpeded top feeding of the vessel during the charging phase and to provide a discharge pipe outside of but connected to the lower side wall of the vessel, conveniently in a horizontal plane, so that discharge of solids from the vessel does not occur through the same port as that through which solids are fed to the vessel.

In summary, all hydraulic hoisting methods employ either lock-hoppers or slurry pumps as mineral feeders. All known methods, operating at any depth, in commercial or proposed practice, require conduit systems comprising extensive piping within shafts which give rise to correspondingly severe maintenance problems.

In addition, presently available lock-hopper systems do not provide the rapid and reliable feeding means needed for hoisting coarse mineral pieces from deep mines and commercial lock-hopper systems are, therefore, confined to relatively shallow mines.

An object of the present invention is to provide an improved hydraulic hoisting method for raising mined mineral from one level in a mine of substantial depth to a higher level or to the surface.

A further object of the present invention is to provide means for the rapid and reliable feeding of a mined mineral into a pressurized hydraulic system.

Additional objects and advantages of the system of the present invention will become apparent in the following description.

Thus, by one aspect of this invention there is provided a method for hydraulic hoisting of mineral solids from one level in a mine to a higher level comprising:

(i) mixing the mineral solids with water at the one level;

(ii) conveying the mixture upwardly in a hoist conduit under pressure to the higher level;

(iii) dewatering the solids and returning the water to the one level in a return conduit for mixing with further mineral solids, thereby forming a hydraulic hoisting circuit; and (iv) providing the hoist conduit and the return conduit as a pair of boreholes between the two levels, the ends of said boreholes connected at the one level to mixing means and at the higher level to dewatering means.

The invention will be described hereinafter with reference to the accompanying drawings in which.

Figure 1:
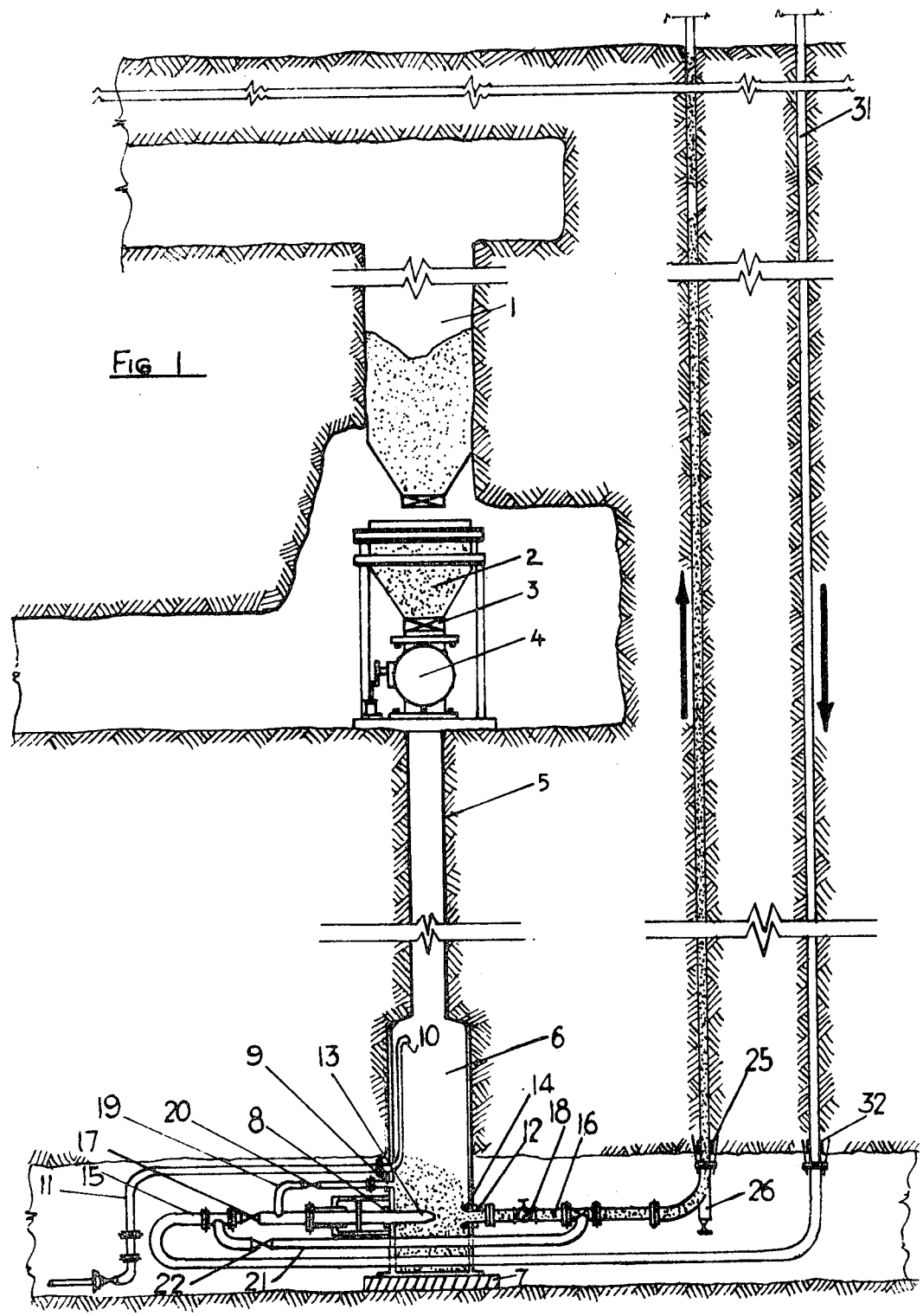
FIG. 1 is a drawing of the pressure vessel and associated charging means.
Figure 2:
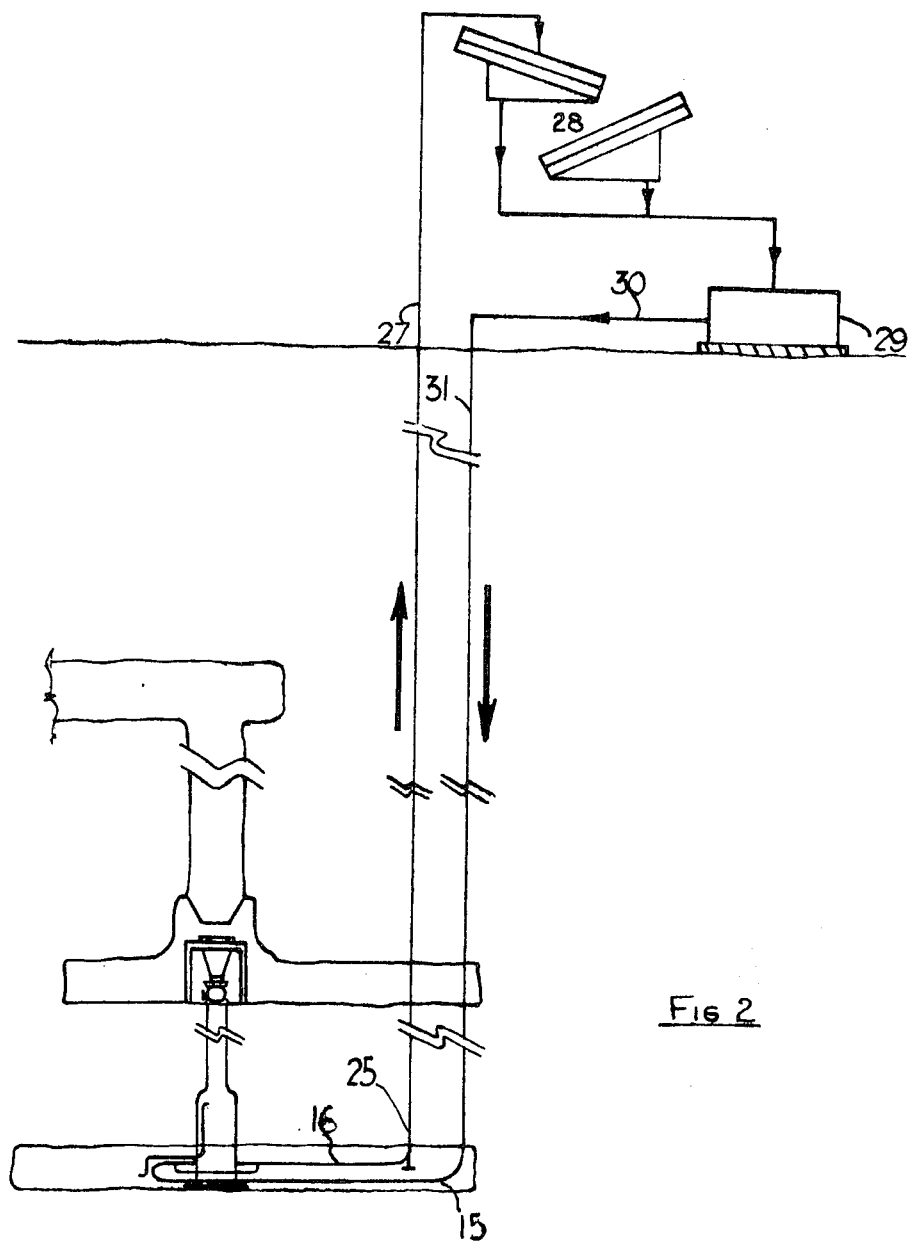
FIG. 2 is a schematic drawing of a hydraulic hoisting system contemplated by the present invention.

Referring to FIGS. 1 and 2, which illustrate a preferred embodiment of the invention the overall system includes a storage raise 1, located vertically above a charge bin 2. An extensible pipe connection 3 is in communication with charge valve 4, which in turn, communicates on its discharge side with a steel lined raise 5. The steel lining is joined at the bottom of the raise to a pressure vessel 6, which is mounted on a concrete foundation 7, and housed in an opening in the rock. The pressure vessel is equipped with a main water inlet port 8, in a sidewall of the vessel, an auxiliary water inlet port 9, and a water drain port 10, connected to water drain line 11. A discharge port 12, is located 180° around the circumference of the vessel from and on the same axis as the main water inlet port 8. The inlet port serves as a point of entry for a horizontally-mounted nozzle pipe 13, which is preferably provided with means, usually hydraulic, for advancing or retracting it across the vessel. An outlet bell 14 is mounted on the sidewall of the vessel around the discharge port 12. The outlet bell and nozzle tip are preferably mutually tapered so as to effect a seal between the nozzle pipe and the bell when the nozzle is advanced so that it engages the outlet bell. Water return pipe 15, and discharge pipe 16, are provided for attachment at the inlet port 8, and discharge port 12, respectively. The return pipe 15, has a nozzle valve 17, and the discharge pipe 16, has an isolating valve 18. An auxiliary water pipe 19, with a valve 20, services the auxiliary port 9. A shunt pipe 21, with associated valve 22, bridges the return pipe 15, and the discharge pipe 16. The discharge pipe extends horizontally from the vessel and terminates in a 90° upward bend where it enters a hoist borehole 25. A seal is made between the pipe and rock by known means and a cleanout leg 26 is provided to dump the contents of the hoist borehole in emergency situations. Advantageously, as shown in FIG. 2, the hoist borehole extends virtually the entire height of the lift, terminating in sealed connection with an exit pipe 27, which is in fluid connection with a dewatering apparatus, generally shown at 28. The underflow of the dewatering system is connected to pumping means 29, of suitable pressure rating, which provides the pressure source for the hoisting system. The pump is conveniently located at the higher level but this is not essential. The pump outlet is connected to a return borehole 31, via pipe 30. The return borehole is of similar length and runs parallel to the hoist borehole and terminates in sealed connection with return pipe 15, which ultimately connects with the pressure vessel via the nozzle pipe 13, and the auxiliary water pipe 19. The boreholes, as described, are substantially vertical, but sloped boreholes, particularly for the return conduit, may in certain circumstances represent a useful modification of this embodiment.

In operation, the system runs with a continuous flow of high pressure water to which charges of a mixture consisting of mineral ore and water are discharged from the pressure vessel at regular intervals.

To charge the solids to the pressure vessel it is essential to isolate the vessel from the hoisting system so that the vessel can be opened to atmosphere for charging. Isolation of the vessel is preferably accomplished by advancing nozzle 13, to engage outlet bell 14, and closing valves 20 and 22, thereby maintaining water flow in the hoisting system while allowing the vessel to be opened to atmosphere for charging of solids thereto. Alternate means to isolate the pressure vessel consist of closing valves 17 and 18, opening valve 22 and bypassing the pressurized water around the pressure vessel through shunt pipe 21.

To describe a single hoisting cycle, it is useful to select as the starting point the time at which the pressure vessel is isolated from the hoisting system, preferably by engaging the nozzle 13 and bell 14 as referred to hereinabove. A batch of the mineral, stored in the raise 1, is allowed to fall into the charge hopper 2. The batch is introduced at atmospheric pressure into the pressure vessel using the extensible pipe connection 3, which directs the mineral through the open charge valve 4 and into the pressure vessel 6 via the steel lined raise 5. The charged pressure vessel is then sealed by withdrawing the extensible charging pipe 3 and closing the charge valve 4.

Upon closing the charge valve, the nozzle pipe 13 is retracted from the outlet bell and valve 20, on the auxiliary water inlet pipe 19, is opened. This action integrates the pressure vessel with the lift system and causes the mineral charge to be simultaneously entrained with water and discharged horizontally through the port 12. The sequence in which the nozzle pipe 13 is retracted and the auxiliary valve 20 opened is not critical but it has been found advantageous to have these events occur more or less simultaneously to avoid undue wear on the nozzle pipe 13 or the outlet bell 14 as a result of surging.

The volume of the solids discharged from the pressure vessel is replaced by the incoming water. The amount of water flow in the auxiliary line as a proportion of the total incoming water has been found to be an effective means of controlling the concentration of solids in the discharge. The water pressure required is dependent on the lift height but generally is less than about 3,000 pounds per square inch (psi).

The mixture of solid mineral and water that leaves the vessel is conveyed horizontally via the discharge pipe 16, into the hoist borehole 25 from which it ultimately discharges into the dewatering system 28 located on the elevated level. As is well known in the art, the type of dewatering system employed will depend on the nature of the mineral being hoisted. For coarse materials a simple screen with appropriately sized openings may suffice whereas, for finely divided minerals in water, thickeners or even filters may be necessary. The water recovered from the dewatering system is pumped using the high pressure pump 29 into the return borehole 31, via the pipe connection 30. The water exits the return borehole into the return pipe 15, which ultimately conveys it to the inlet port 8, on the pressure vessel for mixing with a fresh batch of ore. For a given cycle, when the last of the mineral charge has been removed from the pressure vessel, the vessel is isolated from the lift system, depressurized and drained of sufficient water through drain port 10 and drain line 11, to make room for the batch of ore of the next cycle. It is convenient to pump part of this drain water to the charge hopper 2 and use it in assisting in the next mineral charge to enter the pressure vessel. Depending on the frequency with which the batches are hoisted, and the length of the borehole, more than one batch could be in the borehole at any given time. The hoist sequence is regulated so that when a given mineral charge has been discharged from the pressure vessel, the vessel is immediately isolated from the hoisting system and drained in preparation for the next cycle while lifting of the previous batches continues.

The size of the mined mineral pieces dictates the diameter of the borehole and piping in which the solids are conveyed. Generally, it is desirable to use an internal pipe and borehole diameter which is at least three times the size of the largest ore pieces.

The physical properties of the particular mineral also dictate the flow of water required since the flow is a function of the settling velocity of the mineral pieces and also the bulk density of the discharge mixture. Typically, for pieces about 3 inches in size and having a specific gravity of about 150 lbs/cu. ft. the linear velocity of the water should be about 8 to 10 ft. per second.

The frequency with which the batches are conveyed is linked to the hoisting capacity and the size of the pressure vessel. Thus, for a 300 ton per hour hoisting rate and a pressure vessel capable of holding 30 tons of ore, 10 hoisting cycles are required per hour, or one every 6 minutes. This example is not intended to limit the scope of the invention other than to illustrate that the vessels are kept intentionally small relative to a given hoisting rate since it is preferred to operate with a low-capacity pressure vessel at high frequencies rather than vice versa. Small vessels are advantageous in that they are less expensive and are readily adaptable to existing or conventional mine workings including, for example, their installation in a bored raise with an attendant supply of ore contained in a storage raise above the vessel.

The use of a small vessel necessarily dictates the use of a high frequency batch cycle. The critical feature required of a high frequency batch cycle system is its ability to provide a reliable feeding system. The apparatus of the present invention not only allows rapid cyclical charging and discharging of the vessel but also, by virtue of the relatively small mineral charges, helps prevent the occurrence of any major pressure disturbances, such as "water hammer", in the lines which would tend to hinder the smooth operation of the system.

The use of boreholes for conveying the mineral to the elevated level is considered of fundamental importance to the present invention. It will be appreciated that piping systems are a serious disadvantage at great depths because shafts are required to accommodate the pipes. The provision of large diameter shafts is extremely expensive when compared with the relatively small diameter boreholes in the method of the present invention. Furthermore, boreholes are virtually maintenance-free, provided the competence of the rock has been established beforehand. The use of boreholes in the lift system is, as far as we are aware, unknown in the prior art and is essential to the invention since it provides the basis for a practical mine hoisting system, especially when the hoisting is done from lock-hoppers at great depths.

Those skilled in the art will gain a better understanding of the method of the present invention from the following description of a pilot plant operation located in an operating mine.

A 1 inch steel plate cylindrical pressure vessel, 17 feet in height and 3 feet 10 inches in outside diameter, was embedded in a bored raise with a 9 foot section exposed at the base. The upper end of the vessel was connected, via an unlined raise to an ore storage hopper. The base of the vessel had inlet and discharge ports horizontally connected to respective return and discharge pipes terminating in boreholes located in the manner described in the preferred embodiment. The pressure vessel was equipped with the movable nozzle-bell sealing arrangement which during the charging phase was kept in the advanced (closed) position. A 25 ton charge of nickel and copper bearing sulphide ore, nominally measuring up to 3 inches in size and having a specific gravity of about 150 lbs/cu. ft., was fed to the top of the vessel via the raise, the whole system being at this point virtually filled with water from the previous test. The charge valve was closed and the vessel was pressurized with water, via an auxiliary line, to about 180 pounds per square inch (psi). The nozzle and isolating valves were then opened and the mixture discharged by entrainment and hoisted through the 9⅞ inch diameter borehole to a height of 170 feet where it was screened and the ore subsequently recovered. The hoisting time was 2.3 minutes which was equivalent to a hoisting capacity of 650 tons per hour.

This process was repeated numerous times with no detectable deterioration in the boreholes or equipment. Occasional spalling of the rock was observed in the raise bored above the pressure vessel thereby indicating the preferred design for this section should include a steel lining.

This example, and its numerous successful duplications, demonstrate the feasibility of the system. The performance of the hoist in the pilot tests showed clearly that sufficient capacity was available for its use in a commercial mining installation. Thus, to apply the invention to the higher lifts needed for deeper mines, only a proportionate increase in the operating pressure of the vessel, to overcome the additional head, is required. The borehole diameter, size of the pressure vessel, water flow and ore size all remain constant and adequate pressures may be generated by simply installing higher rated pumps and equipping the pressure vessel with heavier steel plate. Pressures of about 3,000 psi are readily attainable and thus, lifts of up to about 4,500 feet are envisaged for the present system. It will be appreciated that even higher lifts are within the scope of the present invention by connecting two or more of the hoists in series.

The preferred embodiment describes one particular means of practicing the invention, but it will be appreciated that other obvious variations on the method are possible provided the essential requirements of the invention are met. For example, there is considerable latitude in the choice of pressure vessel design and auxiliary equipment, so long as the combination ultimately selected exhibits the high frequency hoisting principle described herein. Similarly, it may be advantageous in certain applications to employ lined boreholes in all or part of the system. It is further recognized that the hydraulic nature of the invention lends itself readily to integration with mine dewatering systems.

We claim:

1. A method for hydraulically hoisting mineral solids, in batch mode, from one level to a higher level of a mine, comprising:
   i. providing a continuous fluid flow path between the levels and circulating water, continuously under pressure, therethrough;
   ii. providing a pressure vessel having fluid inlet and outlet means in opposed sidewalls thereof at the one level in the mine for selective communication with and isolation from the fluid flow path;
   iii. periodically charging mineral solids to the pressure vessel and mixing with water therein, at atmospheric pressure, and isolated from the flow path;
   iv. pressurizing the pressure vessel and selectively incorporating the vessel into the flow path to thereby discharge the mixture into the flow path;
   v. conveying the mixture upwardly, under pressure, along a hoist conduit of the flow path, to the higher level;
   vi. dewatering the mineral solids at the higher level and returning the water along a return conduit of the flow path to the one level for mixing with further mineral solids in the pressure vessel; wherein the return conduit is connected to the inlet means and is provided with nozzle means in the pressure vessel, slidable between a first position in which the pressure vessel is incorporated in the fluid flow path, and a second position in sealing engagement with the outlet means thereby isolating the pressure vessel from the continuous fluid flow path.

2. A method as claimed in claim 1 wherein the nozzle means is moved hydraulically between the first and second positions in the pressure vessel.

3. A method as claimed in claim 2 wherein the mine is located in rock which, when drilled, provides a borehole sufficiently competent to contain water under high pressure and wherein a borehole forms at least part of the fluid flow path.

4. A method as claimed in claim 3 wherein a borehole forms at least part of the hoist conduit and at least part of the return conduit.

5. A method as claimed in claim 4 wherein the nozzle slides in a substantially horizontal plane and is coaxial with the outlet means.

6. A method as claimed in claim 5 wherein the fluid flow path includes valve and conduit means for bypassing the pressure vessel.

7. A method as claimed in claim 5 wherein mineral solids ranging in size up to about 3 inch diameter are conveyed through the hoist conduit.

* * * * *